Sept. 22, 1936.  E. ATTESLANDER  2,054,963
SCAVENGING SYSTEM
Filed July 26, 1934
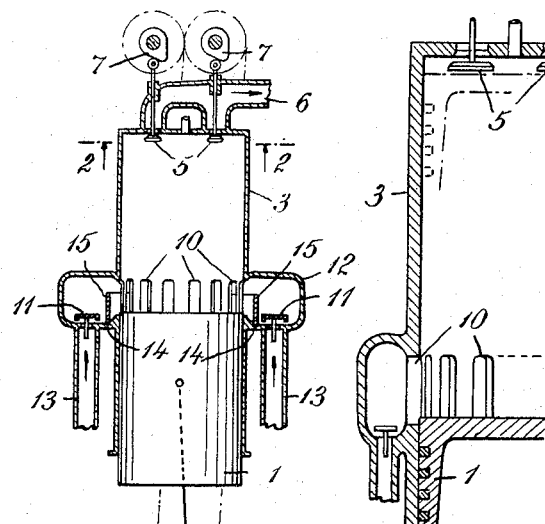
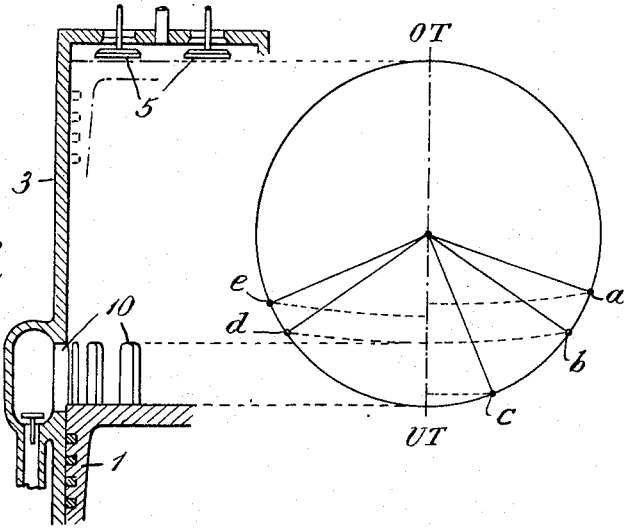
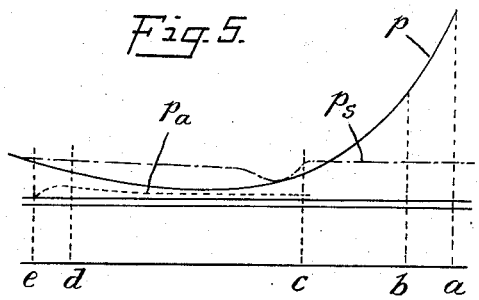
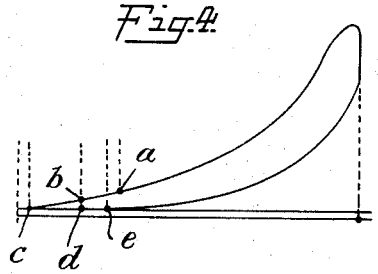
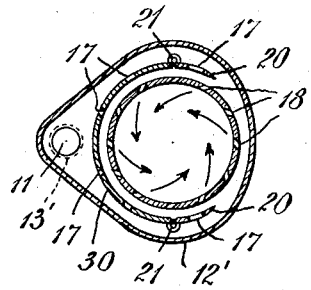
INVENTOR:
Edouard Atteslander,
BY:
HIS ATTORNEYS.

Patented Sept. 22, 1936

2,054,963

UNITED STATES PATENT OFFICE 2,054,963

SCAVENGING SYSTEM

Edouard Atteslander, Winterthur, Switzerland, assignor to Sulzer Frères Societe Anonyme, Winterthur, Switzerland Application July 26, 1934, Serial No. 736,976
In Switzerland August 8, 1933

22 Claims. (Cl. 123—65)

This invention relates to two-cycle, heavy-fuel-burning engines, particularly of the Diesel type; and more especially to those embodying uniflow scavenging systems.

In such engines scavenging starts as soon as the air-inlet ports, controlled by the piston advancing on the working stroke, begin to open. As the piston first begins to uncover the scavenging air inlet ports, the piston head first opens small slits, one at the top of each port, through which the scavenging air commences to enter the cylinder. The first admission of air therefore takes place through these slits. As the cross-section of these slits is small in proportion to the cross-section of the scavenging-air inlet piping, the air let into the cylinder is small in quantity at first, and there is a negligible drop in the pressure and low velocity in the air-supply line. Hence there is very little skin-friction and other flow-resistance in the piping. Thus the total resistance in the piping is negligible and does not make itself effective, so that the full source-pressure on the scavenging air exists right up to the small entrance-slits.

As a consequence, and aided by the increase in orifice-velocity due to the small size of these slits, the first scavenging air enters the large chamber in "hard" compact jets. The comparatively light burnt and waste gases then present in the working-chamber offer very little resistance to these jets, and hence the jets shoot throughout the gases and the working-space and reach the cylinder cover with their initial speed little diminished, from which they rebound, in part, and again mix with and agitate the burnt gases. This violent agitation of the burnt gases within the cylinder presents orderly and effective scavenging. The completeness and timing of scavenging, as well as the speed of scavenging is caused to vary from stroke to stroke, especially at high scavenging pressures.

In addition these "hard" compact scavenging air jets consist of cold fresh air. The piston head, cylinder cover and the upper parts of the cylinder walls which become very highly heated, undergo, on the impact of such cold air, a sudden cooling, which very nearly approaches a chilling process and is extremely injurious to the material. The constant repetition of this chilling tends to set up internal changes in the molecular structure of the metal, which may result in capillary cracks, which in turn form the starting point for heat cracks.

It is the chief object of this invention to obviate these disadvantages, preventing the entrance of "hard" compact jets of dense cold air under high pressure and velocity at the commencement of scavenging, preventing to a large degree the setting up of turbulence and eddy-currents in the cylinder and the intermixing of the scavenging air and burnt gases, and displacing these gases from the cylinder with a minimum of agitation.

In carrying out the invention, means are provided for making the piping resistance of the scavenging air supply system influence to a substantial extent the delivery of scavenging air to the working chamber of the engine, thereby rendering the velocity of such air low and uniform. Thus there are arranged ahead of at least part of the air admission ports, auxiliary valves which open after the air admission ports begin to be uncovered by the piston. Preferably these auxiliary valves are of the pressure-operated or so-called "automatic" type. The cylinder ports are so formed that at the time of opening of these auxiliary valves the cross sectional area of the cylinder ports which is then uncovered by the piston is so large that it is not a substantial factor in retarding the flow of the scavenging air to the cylinder or in increasing its velocity. The sudden discharge of air into the cylinder when the ports are first "cracked" open by the piston is thus prevented, and the flow of scavenging air into the cylinder is from the first determined to a large extent by the resistance to flow in the air supply piping so that the scavenging air enters the cylinder at a substantially uniform low pressure and velocity.

The invention will be understood in greater detail by a consideration of the accompanying drawing and the following description in reference thereto, the drawing illustrating by way of example and more or less diagrammatically, one embodiment of the invention, and the scope of the invention being set forth in the claims appended to this specification.

Fig. 1 is a typical vertical section, somewhat diagrammatic, of the invention applied to a two-cycle engine with uniflow scavenging;

Fig. 2 is a section along line 2—2 of Fig. 1;

Fig. 3 is a diagram of the crank-performance, showing the relation of the crank-angle to the piston position;

Fig. 4 is a graph of the pressure-characteristics with piston strokes as abscissæ;

Fig. 5 is a triple graph of the cylinder-pressures; the scavenging-air pressures; and the exhaust gas pressures, on a different scale and plotted on a geometrical development or evolute of the crank diagram as abscissæ; and Fig. 6 shows a modification of the invention.

In the construction shown in Fig. 1, a piston 1, through a connecting rod 2', drives a crankshaft 2, and reciprocates in a cylinder 3.

The cylinder 3 has four exhaust valves 5 at its cover end, shown more particularly in Fig. 2, and more specifically described hereinafter. There is a common exhaust header and pipe 6, leading off from these valves, and the valves are controlled by an overhead cam-system 7. The cams 7 are driven from the crankshaft by suitable means, not shown.

At the other end of the cylinder, near bottom or outer dead center, are located piston-controlled, scavenging, and supercharging-air ports 10, surrounded by an annulus or ring-channel 12, to which are connected air-supply pipes 13. The total area of ports 10 equals at least one-third of the interior area of the cylinder, and they have a vertical location such that they are fully uncovered by the time the exhaust valves 5 are open. The ring 12 contains at least two obturators 11, preferably poppet valves, which are suitably designed and operated to control the feed of air from the pipes 13, connected to a compressed air reservoir, not shown. The total cross-sectional area of the ports controlled by members 11 equals at least one-half that of those controlled by valves 5. Moreover, the members 11 are so operated that, at the peak load, they open no sooner than when at least one-fourth, and preferably more, of the total cross-sectional area of the ports 10 has been uncovered.

Between each of the valves 11 and the nearest one of the ports 10 is provided a slot or groove 14, into which are inserted deflector-members 15. The members 15 extend upwardly only part of the height of the ports 10 and of the ring 12, and by virtue of their construction and their location compensate for some of the ports 10 being farther than others from the valves 11 by obstructing the speedily-flowing air and preventing it from short-circuiting through those ports which are nearer to the valves 11, and thus adjust and equalize the flow.

In high-speed engines there is a tendency for the air to flow along the central axis of the cylinder leaving the periphery insufficiently scavenged. In two-cycle engines of this type having only the standard construction with the exhaust valve, or valves, located near the center of the cylinder head, there is therefore a premature escape or loss of the scavenging air. In the present invention this non-uniformity of air-flow is overcome by constructing and arranging several exhaust valves 5 in the manner shown in Fig. 2, and preferably closely adjacent the periphery of the cylinder, whereby to accelerate the sweeping-out of the exhaust gases at the periphery, instead of doing it only at the center, of the cylinder.

The performance characteristics of the engine, and the improved method of the present invention, are shown in Figs. 3, 4, and 5. Combustion occurs in the vicinity of top dead center, OT, in Fig. 3, followed by expansion, until at point $a$ in Figs. 3, 4, and 5, the exhaust valves 5 open and the exhausting step begins. The valves 11 are not controlled by the piston, but operate independently and automatically, and on the continued movement of the piston they stay closed while the ports 10 are uncovered, as at $b$. The pressures within and without the cylinder are thereby equalized, before bottom dead center, UT, i. e. at $c$. In the meantime the ports 10 have already been opened to an unusual extent by piston 1, and when valves 11 are opened suddenly, scavenging air enters the cylinder through an extraordinarily large total port cross-section; and, right at the start of its admission, flows and enters from all directions slowly, and at substantially uniform pressure, and the introduction of air in "hard", high pressure and high velocity jets at the commencement of scavenging is avoided.

This fact can be seen more graphically from Fig. 5, where it is shown that the pressure $p$ in the cylinder falls quite rapidly from the start, due to piping resistance hereinafter explained, and that the scavenging pressure $p_s$ also falls exceedingly rapidly and is very low at the beginning of scavenging-proper, since at the moment of opening valves 11 the cross-sectional area of the ports 10 that is already open is so exceedingly large that from the very beginning, the air is not accelerated by surface-flow and enters only slowly, and thus the speed all the way back through pipes 13 is rendered very low, uniform, and not gusty.

Since there is no air speed step-up due to small available orifices in ports 10, contrary to usual practice, the speed of the air in pipes 13 is permitted to be high enough to make the skin-friction and other air-resistance in pipes 13 perceptible, and they then have an appreciable effect, causing the initial pressure-drop above referred to. The speed at which the air issues from ports 10 is low, and therefore, the air, instead of being injected into the cylinder in spurts, simply "presses in", equally from all sides all around the periphery and the streams through the several ports merge and pack together at once over the piston-head in the form of a segregated, compact "gas-piston", composed of pure air mixed with the burnt gases thereat, and having a specific gravity intermediate that of the pure air and that of the spent gases. This piston then starts to move bodily towards the opposite end of the cylinder under the pressure of the steadily incoming air, and, at a uniform speed, positively displaces the light, completely burnt gases and forces them out through the exhaust valves 5 and the pipes 6, also at an approximately uniform speed.

The higher specific gravity of the "gas-piston" than of the burnt gases at the top, together with its being compressed and compacted, assists in keeping the "gas-piston" from mixing with the burned gases above it. As the scavenging process continues, though the scavenging pressure in the pipes 13 does increase somewhat, the size of the opening of the ports 10 also correspondingly increases, to the point UT (bottom or outer dead center), and this results in making the air-feed speed substantially uniform, as the exhaust pressure $p_a$ remains substantially constant.

The admission of air continues to point $d$ where the ports 10 are completely covered by the piston, now on the up-stroke, and in order to effectuate raising the pressure in the cylinder to the scavenging-air pressure, it is provided that the exhaust valves 5 close, at point e close to the end of the exhaust step and preferably after the admission ports are closed, as shown, so that the pressure $p_a$ falls, and, at point e, drops to the pressure in the exhaust piping.

In the modification shown in Fig. 6, there is provided a scavenging-air inlet conduit 13' on only one side of the engine, and it is arranged to provide paths of varying lengths to ports 18 distributed around the periphery of the cylinder. In order, among other things, to compensate for the variance in pressure due to variance in length of the paths in supplying air to the more distant of the ports 18, and thereby obtain a uniform distribution of air over the whole cross-section of the cylinder, there is provided a deflector member 30, fixed in the annular channel intermediate the cylinder and the channel wall 12', and extending the entire interior height of the annulus. The deflector is provided with ports 17. The more distant of the ports 17 from the inlet 11 are larger than the proximate ones, and the ports 17 vary directly in size as their distance from the port 11, so that the air entering the proximate ones is throttled more than the air entering the more distant ones. The ends of the deflectors are hinged and constitute flaps 20, rotatable about an axis 21.

In both embodiments, by opening the air-admission ports in the cylinder wall and delaying the opening of the obturators in the air-feed pipe, the pressure in the annular channel equalizes with that in the cylinder, and thus the skin-friction and other resistances in the air-supply systems are enabled to bear an effective ratio to the diminished speed of the air-flow in the supply-pipes and thus make themselves felt, and the pressure anterior to the cylinder-wall ports has dropped so far by the time the obturators open that the scavenging air enters the cylinder at only a moderate speed. In either form, also, the large size of the available entry-cross-section, coupled with this moderate and uniform entry from all sides, results in forming a gas piston. In both embodiments the cooperation of the deflectors with this improved admission of air promotes the formation of this gas-piston, and in the form of Fig. 6, the throttling ports 17 effectuate uniform admission of air at all points of the cylinder.

Among the advantages inherent in the present invention in addition to overcoming the defects pointed out initially, and including improved scavenging and "non-chilling", may be mentioned the fact that as the air has to be introduced near the end of the piston stroke, only, the power necessary to supply air is curtailed enormously. Also may be pointed out the fact that the improved scavenging gives rise to a considerably lengthened expansion stroke, and this in contrast to the subsistent engines in which a serious portion of the expansion stroke must be cut off.

Due to the gradual steady increase of the air-inlet, the gas-piston is gradually compacted and due to its increasing density; because of the proportion of gas to air incoming, it cannot thereafter be penetrated and broken up. By mixing the combustion gases with the pure scavenging air at the beginning of scavenging, the formation of the gas piston is enhanced, and by closing the exhaust valves after the admission ports are covered, scavenging of the top of the cylinder is improved, and the small amount of scavenging air or air for compression lost due to this improvement is well worth the novel flow-off of gases from the extreme periphery thereby achieved.

In case a part of the scavenging air tends to short-circuit up along the axis of the cylinder, the peripheral location of the exhaust ports has an equalizing effect, and prevents a too large "drafting-off" of the scavenging air. Both the opening and the closing of the exhaust valves takes place at the same position of the piston, whereby reversing the engine is simplified; and at high speeds, the exhaust pipe can be throttled in the ordinary way.

The valves 11 can be either automatic, as described, or controlled by, or in accordance with, the piston or crank position, and their number can well be increased, and they may be arranged uniformly all around the cylinder. They may be controlled, opened and closed, in fact, in any desired way, so long as, regardless of the pressure in the working chamber equalizing, they are opened as soon as the total area of the openings uncovered by the piston is large enough to effectuate a moderate, non-turbulent, etc. speed of the air admitted into the cylinder. Though described otherwise, the exhaust valves may, if desired, be closed before the admission ports are entirely covered. If desired, the cross-section of the exhaust piping can be made such that, at the closing of the exhaust valves, the pressure in the cylinder corresponds to the scavenging pressure.

I claim:

1. A two-cycle engine, including a cylinder; a piston therein, a plurality of differently positioned air-admission ports near one end of the cylinder, a common air-supplying chamber for said ports having an inlet, and means for adjusting the air-speed at the several differently-positioned ports so as to render the air-speed through all of said ports substantially uniform regardless of their distance from the air-inlet.

2. A two-cycle engine including a cylinder, a piston therein, and exhaust-valves, the cylinder having air-admission apertures near the outer-dead-center zone, an air-supply system comprising an annular member surrounding the cylinder, a conduit thereto from a source of scavenging air, obturator means in said annular member, and means for opening same after the said apertures in the cylinder are uncovered.

3. A two-cycle engine, including a cylinder, a piston therein and exhaust-valves, the cylinder having air-admission apertures near the outer-dead-center zone, an air-supply system comprising an annular member surrounding the cylinder, a conduit thereto from a source of scavenging air, obturator means in said annular member, means for opening same after the said apertures in the cylinder are uncovered, and members in front of some of the said apertures for equalizing air-admission speeds.

4. A two-cycle engine, including a cylinder, a piston therein, and exhaust-valves, the cylinder having air-admission apertures near the outer-dead-center zone, a chamber communicating with said apertures, a conduit thereto from a source of scavenging air, obturator means in said chamber, and means for opening same after the said apertures in the cylinder are uncovered, the said apertures and said piston so cooperating with each other as to have exposed, by the time said obturators are opening, a cross-section for the entry of scavenging air so large that from the beginning of scavenging the velocity of the scavenging air entering the cylinder is sufficiently low to substantially prevent the formation of jets, turbulence, or eddies within the cylinder.

5. A two-cycle engine, including a cylinder, a piston therein, and exhaust-valves, the cylinder having air-admission apertures near the outer-dead-center zone, an air-supply system comprising an annular member surrounding the cylinder, a conduit thereto from a source of scavenging air, obturator means in said annular member, and means for opening same after the said apertures in the cylinder are uncovered, the said apertures and said piston effectuating such cooperation between them that when said obturators begin to open, at least one-fourth the total cross-section of said apertures is already uncovered.

6. A two-cycle engine, including a cylinder, a piston therein, and exhaust-valves, the cylinder having air-admission apertures near the outer-dead-center zone, an air-supply system comprising an annular member surrounding the cylinder, a conduit thereto from a source of scavenging air, obturator means in said annular member, and means for opening same after the said apertures in the cylinder are uncovered, the total cross-sectional area of said obturators equalling at least one-half the total cross-section of the exhaust valves.

7. A two-cycle engine, including a cylinder, a piston therein, and exhaust-valves, the cylinder having air-admission apertures near the outer-dead-center zone, an air-supply system comprising an annular member surrounding the cylinder, a conduit thereto from a source of scavenging air, obturator means in said annular member, and means for opening same after the said apertures in the cylinder are uncovered, the total width of the said air-admission apertures equalling at least one-third the circumference of the cylinder wall.

8. A two-cycle engine, including a cylinder, a piston therein and exhaust-valves, the cylinder having air-admission apertures near the outer-dead-center zone, a chamber communicating with said apertures, a conduit thereto from a source of scavenging air, obturator means in said chamber, and means for opening same after the said apertures in the cylinder are uncovered, the said apertures being located at such a point in the cylinder wall that they begin to be uncovered at about the time the exhaust begins to open.

9. In an internal combustion engine, a cylinder having air-inlet ports therein, a hollow member surrounding same, means for supplying air to said hollow member, and deflector means located in said hollow member and arranged with respect to said inlet ports and said air supply means to equalize the distribution of air to said ports.

10. In an internal combustion engine, a cylinder having air-inlet ports therein, a hollow member surrounding same, means for supplying air to said hollow member, and deflector members located in said hollow member, said deflector members comprising plates projecting vertically from a wall of said hollow member in front of the nearest cylinder air-inlet ports.

11. In an internal combustion engine, a cylinder having air-inlet ports therein, a hollow member surrounding same, means for supplying air to said hollow member, and deflector members located in said hollow member, said deflector members comprising plates projecting vertically from the base of said hollow member in front of the nearest cylinder air-inlet ports and extending only partially of the height of said hollow member.

12. In an internal combustion engine, a cylinder having air-inlet ports therein, a hollow member surrounding same and having grooves therein, means for supplying air to said member, and deflector members detachably located in said grooves in said hollow member.

13. In an internal combustion engine including a cylinder having air-admission ports near its lower end; a hollow member therearound, an air-inlet at one side of said member, and a baffle-member extending the full interior height of said hollow member.

14. In an internal combustion engine including a cylinder having air-admission ports near its lower end; a hollow member therearound, an air-inlet at one side of said member, a baffle-member extending the full interior height of said hollow member, and having ports increasing in size directly as their distance from said inlet increases.

15. In an internal combustion engine including a cylinder having air-admission ports near its lower end; a hollow member therearound, an air-inlet at one side of said member, and a baffle-member in said hollow member, said baffle-member having ports increasing in size directly as their distance from said inlet increases.

16. In an internal combustion engine including a cylinder having air-admission ports near its lower end; a hollow member therearound, an air-inlet at one side of said member, and a baffle-member in said hollow member, said baffle-member having ports increasing in size directly as their distance from said inlet increases, the baffle partially encircling the cylinder wall and the ends approaching closely the sides of the hollow member.

17. In an internal combustion engine including a cylinder having air-admission ports near its lower end; a member therearound, an air-inlet at one side of said member, and a baffle-member in the interior of said first member, and having ports increasing in size directly as their distance from said inlet increases, the baffle being divided at each of its distal ends into sections, and said ends being hinged to the standing part of the baffle.

18. The method of scavenging an internal combustion engine having a uniflow scavenging system including an inlet-way, comprising setting up an effective flow-resistance in the scavenging inlet-way to thereby prevent a sudden violent inrush of air to the engine at the opening of the inlet-way and to render the air-speed slow and uniform; causing the air to enter slowly and non-turbulently into the working-zone in a plurality of streams in horizontal-planar form; agglomerating said streams; allowing the mass to rise; aiding the rise by continuing scavenging-air feed; and by said mass positively and directly pushing all fluids lying above said mass up entirely out of the engine.

19. The method of scavenging an internal combustion engine including an air-inlet-zone, comprising segregating a zone anterior to the inlet zone; establishing communication between the two zones while keeping the segregated zone closed to air-supply until a predetermined amount of inlet-zone is made operative by the piston; lowering the cylinder pressure and equalizing the pressure in the cylinder and the segregated zone; entraining scavenging air from all directions uniformly at a moderate speed in planar form; agglomerating same into a gas-piston zone; continuing air-admission and uniformly displacing the said last zone and completely evacuating the cylinder therewith.

20. The method of scavenging an internal combustion engine, comprising feeding air towards the working-zone; segregating already-present air in a separate zone from the working-zone; equalizing the pressure therein with that in the working-zone; creating a comparatively large inlet-zone before establishing communication between the air-feed stream and said segregated zone; setting up an effective resistance-to-flow in the air-inlet stream prior to its entry into said segregated zone; introducing the air into the working-zone in a plurality of streams; gathering said streams into a mass; allowing the mass to rise; aiding the rise by continuing scavenging-air feed; and positively and directly pushing all fluids lying above said mass up out of the engine.

21. A two cycle engine comprising a piston, a cylinder having a working chamber, an exhaust opening at one end of said chamber, air-admission apertures adapted to be controlled by the piston and arranged at the opposite end of said chamber so as to admit scavenging air thereto from all sides, a scavenging air supply system connected to said apertures and adapted to supply air to the cylinder at substantially uniform velocity during the scavenging period, said system including flow-resistance means, and means for temporarily delaying the flow of scavenging air to the cylinder until after the piston has uncovered a substantial area of the piston controlled air admission apertures so as to prevent the velocity of the air from being increased on account of the restriction of said apertures by the piston and permitting said air, entering the cylinder from all sides, to pass toward the opposite end of the working chamber without mixing to a substantial extent with the burned gases therein and thus forcing said gases in a body toward the exhaust opening at the opposite end of said chamber.

22. A two cycle engine comprising a piston, a cylinder having a working chamber, an exhaust opening at one end of said chamber, air admission apertures adapted to be controlled by the piston and arranged at the opposite end of said chamber and a scavenging air supply system connected to said apertures, said system including flow resistance means and means for delaying the flow of scavenging air to the working chamber until after the piston has uncovered a substantial area of the air admission apertures.

EDOUARD ATTESLANDER.